United States Patent
Hwang et al.

(10) Patent No.: US 11,399,335 B2
(45) Date of Patent: Jul. 26, 2022

(54) NETWORK OPERATOR ASSISTED CONNECTIVITY OVER A SECOND NETWORK

(71) Applicant: Nokia Solutions and Networks Oy, Espoo (FI)

(72) Inventors: Woonhee Hwang, Espoo (FI); Daniela Laselva, Klarup (DK); Frank Frederiksen, Klarup (DK); Jeroen Wigard, Klarup (DK)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 15/515,021

(22) PCT Filed: Sep. 29, 2014

(86) PCT No.: PCT/EP2014/070802
§ 371 (c)(1),
(2) Date: Mar. 28, 2017

(87) PCT Pub. No.: WO2016/050267
PCT Pub. Date: Apr. 7, 2016

(65) Prior Publication Data
US 2017/0223616 A1    Aug. 3, 2017

(51) Int. Cl.
*H04W 48/14* (2009.01)
*H04W 48/20* (2009.01)
*H04W 48/08* (2009.01)
*H04W 84/12* (2009.01)

(52) U.S. Cl.
CPC ........... *H04W 48/14* (2013.01); *H04W 48/20* (2013.01); *H04W 48/08* (2013.01); *H04W 84/12* (2013.01)

(58) Field of Classification Search
CPC ..... H04W 48/14; H04W 48/20; H04W 48/08; H04W 84/01
See application file for complete search history.

(56) References Cited

U.S. PATENT DOCUMENTS

| 8,711,767 B2 * | 4/2014 | Balasubramanian ........................ H04W 48/16 370/328 |
| 2004/0203792 A1 * | 10/2004 | Shaheen ........... H04W 36/0083 455/552.1 |

(Continued)

FOREIGN PATENT DOCUMENTS

EP    2026622 A1 *  2/2009 ............ H04W 48/18

OTHER PUBLICATIONS

"[AT&T] (To Be Replaced By 3GPP TSG RAN2) "[Proposed DRAFT] Reply LS on WLAN/3GPP, the 3GPP Draft; R2-143796, 3rd Generation Partnership Project (3GPP), Aug. 17, 2014 (Aug. 17, 2014), XP050794731.*

(Continued)

*Primary Examiner* — Mehmood B. Khan
(74) *Attorney, Agent, or Firm* — Joseph C. Drish; Harrington & Smith

(57) ABSTRACT

There is provided a method including determining, from a plurality of groups of access points, a group of a detected access point, each group having at least one property different from another group and using threshold information associated with the determined group to determine whether to connect to a network using said detected access point.

37 Claims, 4 Drawing Sheets

---

Determining, from a plurality of groups of access points, a group of a detected access point, each group having at least one property different from another group Using threshold information associated with the determined group to determine whether to connect to a network using said detected access point

(56) References Cited

U.S. PATENT DOCUMENTS

| | | | | |
|---|---|---|---|---|
| 2005/0032535 | A1* | 2/2005 | Shitama | H04W 48/16 455/512 |
| 2005/0202823 | A1* | 9/2005 | Shaheen | H04W 48/18 455/411 |
| 2006/0030312 | A1* | 2/2006 | Han | H04N 21/64 455/432.1 |
| 2006/0050742 | A1* | 3/2006 | Grandhi | H04B 7/2612 370/506 |
| 2008/0219208 | A1* | 9/2008 | Adams | H04W 48/20 370/328 |
| 2008/0259870 | A1* | 10/2008 | Olvera-Hernandez | H04L 67/14 370/331 |
| 2009/0082020 | A1* | 3/2009 | Ch'ng | H04W 48/20 455/435.3 |
| 2010/0272218 | A1* | 10/2010 | Yeh | H04L 5/0035 375/330 |
| 2014/0204834 | A1* | 7/2014 | Singh | H04W 36/03 370/315 |
| 2014/0357285 | A1* | 12/2014 | Smith | H04W 16/14 455/450 |
| 2015/0029879 | A1* | 1/2015 | Chou | H04W 76/10 370/252 |
| 2015/0195779 | A1* | 7/2015 | Wu | H04W 48/16 370/338 |
| 2015/0271729 | A1* | 9/2015 | Sirotkin | H04W 48/00 370/332 |
| 2015/0288427 | A1* | 10/2015 | Wang | H04B 7/024 370/329 |
| 2015/0327139 | A1* | 11/2015 | Sirotkin | H04W 76/27 370/332 |
| 2016/0036657 | A1* | 2/2016 | Ardeli | H04W 48/20 370/235 |
| 2016/0044591 | A1* | 2/2016 | Pao | H04W 72/10 370/329 |
| 2016/0183147 | A1* | 6/2016 | Da Silva | H04W 36/22 370/331 |
| 2016/0205592 | A1* | 7/2016 | Koskinen | H04W 28/08 370/230 |
| 2016/0269985 | A1* | 9/2016 | Bergstrom | H04W 48/18 |
| 2016/0295466 | A1* | 10/2016 | da Silva | H04W 36/0066 |
| 2016/0316405 | A1* | 10/2016 | Balan | H04W 36/30 |
| 2016/0353324 | A1* | 12/2016 | Lee | H04W 28/08 |
| 2017/0026887 | A1* | 1/2017 | Sirotkin | H04W 36/32 |
| 2017/0215105 | A1* | 7/2017 | Tan Bergström et al. | H04W 28/08 |

OTHER PUBLICATIONS

"[AT&T] (To Be Replaced By 3GPP TSG RAN2) "[Proposed DRAFT] Reply LS on WLAN/3GPP, the 3GPP Draft; R2-143796, 3rd Generation Partnership Project (3GPP), Aug. 17, 2014 (Aug. 17, 2014), XP050794731 (Year: 2014).*

3GPP TSG RAN WG2 Meeting #87, Dresden, Germany, Aug. 18-22, 2014, R2-143796, "[Proposed DRAFT] Reply LS on WLAN/3GPP Radio Interworking", [AT&T] (to be replaced by 3GPP TSG RAN2), 2 pgs.

SA WG2 Temporary Document, SA WG2 Meeting #130, May 17-23, 2014, Phoenix, USA, S2-141832, "Use of RAN Assistance Thresholds in ANDSF", AT&T, InterDigital Communications, 6 pgs.

3GPP TS 25.304 V 12.3.0 (Sep. 2014), "3td Generation Partnership Project; Technical Specification Group Radio Access Network; User Equipment (UE) procedures in idle mode and procedures for cell reselection in connected mode (Release 12)", Section 5.10, 4 pgs.

* cited by examiner

NETWORK OPERATOR ASSISTED CONNECTIVITY OVER A SECOND NETWORK

The present application relates to a method, apparatus and system and in particular but not exclusively, network operator assisted connectivity over a second network.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases.

In a first aspect there is provided a method comprising determining, from a plurality of groups of access points, a group of a detected access point, each group having at least one property different from another group and using threshold information associated with the determined group to determine whether to connect to a network using said detected access point.

The at least one property may comprise access point capability information.

Access point capability information may comprise at least one of system bandwidth, number of transmitter antennas, number of receiver antennas, multiple-input multiple-output streams and a supported standard.

The method may comprise determining the group in dependence on preconfigured information.

The method may comprise receiving preconfigured information from a radio access network.

The preconfigured information may comprise, for at least one group of the plurality of groups, properties associated with the group.

The method may comprise determining the group in dependence on capability information of the detected access point.

The method may comprise receiving capability information of the detected access point from one of an access point beacon and an access network query protocol.

The preconfigured information may comprise, for at least one group of the plurality of groups, identification information for access points associated with the group.

The method may comprise determining the group in dependence on identification information of the detected access point.

The method may comprise receiving, for at least one group of the plurality of groups, threshold information associated with said group.

The network may be a wireless local area network.

In a second aspect there is provided a method comprising providing to a user equipment, for at least one group of a plurality of groups of access points, each group having at least one property different from another group, threshold information associated with the at least one group, said threshold information used to determine whether to connect the user equipment to a network using a detected access point.

The method may comprise providing preconfigured information to the user equipment, said preconfigured information used to determine the group of the detected access point.

The preconfigured information may comprise, for at least one group of the plurality of groups, properties associated with the group.

The at least one property may comprise access point capability information.

Access point capability information may comprise at least one of system bandwidth, number of transmitter antennas, number of receiver antennas, multiple-input multiple-output streams and a supported standard.

The preconfigured information may comprise, for at least one group of the plurality of groups, identification information for access points associated with the group.

The network may be a wireless local area network.

In a third aspect there is provided an apparatus comprising at least one processor and at least one memory including a computer program code, the at least one memory and the computer program code configured to, with the at least one processor, cause the apparatus at least to: determine, from a plurality of groups of access points, a group of a detected access point, each group having at least one property different from another group; and use threshold information associated with the determined group to determine whether to connect to a network using said detected access point.

The at least one property may comprise access point capability information.

Access point capability information may comprise at least one of system bandwidth, number of transmitter antennas, number of receiver antennas, multiple-input multiple-output streams and a supported standard.

The apparatus may be configured to determine the group in dependence on preconfigured information.

The apparatus may be configured to receive preconfigured information from a radio access network.

The preconfigured information may comprise, for at least one group of the plurality of groups, properties associated with the group.

The apparatus may be configured to determine the group in dependence on capability information of the detected access point.

The apparatus may be configured to receive capability information of the detected access point from one of an access point beacon and an access network query protocol.

The preconfigured information may comprise, for at least one group of the plurality of groups, identification information for access points associated with the group.

The apparatus may be configured to determine the group in dependence on identification information of the detected access point.

The apparatus may be configured to receive, for at least one group of the plurality of groups, threshold information associated with said group.

The network may be a wireless local area network.

In a fourth aspect there is provided an apparatus comprising at least one processor and at least one memory including a computer program code, the at least one memory and the computer program code configured to, with the at least one processor, cause the apparatus at least to: provide to a user equipment, for at least one group of a plurality of groups of access points, each group having at least one property different from another group, threshold information associated with the at least one group, said threshold information used to determine whether to connect the user equipment to a network using a detected access point.

The apparatus may be configured to provide preconfigured information to the user equipment, said preconfigured information used to determine the group of the detected access point.

The preconfigured information may comprise, for at least one group of the plurality of groups, properties associated with the group.

The at least one property may comprise access point capability information.

Access point capability information may comprise at least one of system bandwidth, number of transmitter antennas, number of receiver antennas, multiple-input multiple-output streams and a supported standard.

The preconfigured information may comprise, for at least one group of the plurality of groups, identification information for access points associated with the group.

The network may be a wireless local area network.

In a fifth aspect there is provided a computer program embodied on a computer-readable storage medium, the computer program comprising program code for controlling a process to execute a process, the process comprising: determining, from a plurality of groups of access points, a group of a detected access point, each group having at least one property different from another group and using threshold information associated with the determined group to determine whether to connect to a network using said detected access point.

The at least one property may comprise access point capability information.

Access point capability information may comprise at least one of system bandwidth, number of transmitter antennas, number of receiver antennas, multiple-input multiple-output streams and a supported standard.

The process may comprise determining the group in dependence on preconfigured information.

The process may comprise receiving preconfigured information from a radio access network.

The preconfigured information may comprise, for at least one group of the plurality of groups, properties associated with the group.

The process may comprise determining the group in dependence on capability information of the detected access point.

The process may comprise receiving capability information of the detected access point from one of an access point beacon and an access network query protocol.

The preconfigured information may comprise, for at least one group of the plurality of groups, identification information for access points associated with the group.

The process may comprise determining the group in dependence on identification information of the detected access point.

The process may comprise receiving, for at least one group of the plurality of groups, threshold information associated with said group.

The network may be a wireless local area network.

In a sixth aspect there is provided a computer program embodied on a computer-readable storage medium, the computer program comprising program code for controlling a process to execute a process, the process comprising: provide to a user equipment, for at least one group of a plurality of groups of access points, each group having at least one property different from another group, threshold information associated with the at least one group, said threshold information used to determine whether to connect the user equipment to a network using a detected access point.

The process may comprise providing preconfigured information to the user equipment, said preconfigured information used to determine the group of the detected access point.

The preconfigured information may comprise, for at least one group of the plurality of groups, properties associated with the group.

The at least one property may comprise access point capability information.

Access point capability information may comprise at least one of system bandwidth, number of transmitter antennas, number of receiver antennas, multiple-input multiple-output streams and a supported standard.

The preconfigured information may comprise, for at least one group of the plurality of groups, identification information for access points associated with the group.

The network may be a wireless local area network.

In a seventh aspect there is provided an apparatus, said apparatus comprising means for performing the method of the first and/or second aspects.

In an eighth aspect there is provided a computer program product for a computer, comprising software code portions for performing the steps the method of the first and/or second aspects when said product is run on the computer.

In the above, many different embodiments have been described. It should be appreciated that further embodiments may be provided by the combination of any two or more of the embodiments described above.

Embodiments will now be described, by way of example only, with reference to the accompanying Figures in which.

Before explaining in detail the examples, certain general principles of a wireless communication system and mobile communication devices are briefly explained with reference to FIGS. 1 to 2 to assist in understanding the technology underlying the described examples.

Figure 1:
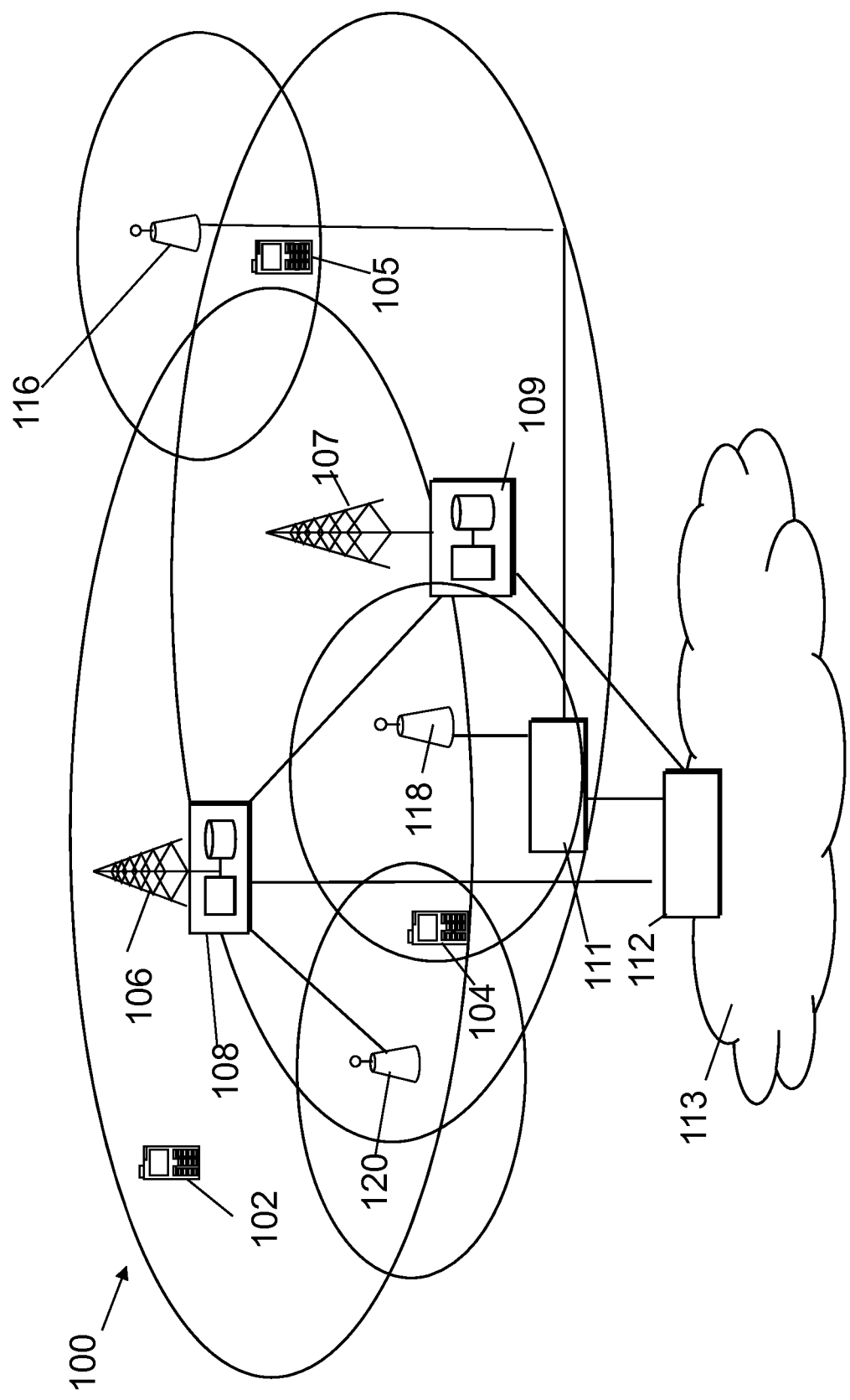
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or access point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
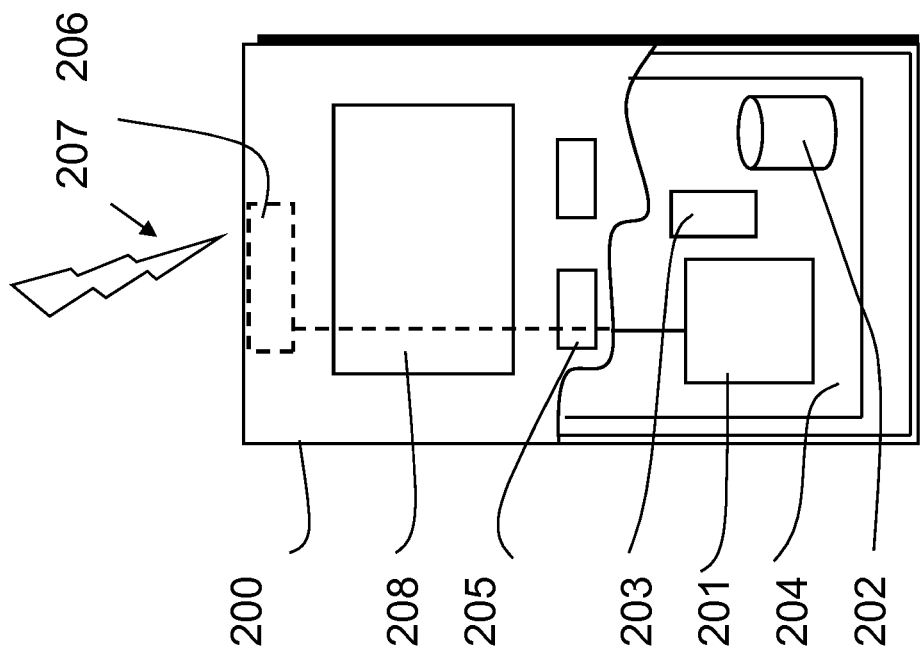
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/

Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Mobile Network Operators (MNOs) may deploy a second network, such as a Wireless Local Area Network (WLAN), which may be carrier-grade, as a complementary system to cellular networks. Network-controlled load balancing between cellular and WLAN systems may improve network performance and user experience.

In RAN interworking, such as 3GPP and WLAN interworking, both network selection, at the start of a new connection, and traffic routing, during an existing connection, may be supported and governed by rules. These rules may be RAN defined rules or ANDSF (Access Network Discovery and Selection Function) rules. RAN interworking may rely on various thresholds, which may be part of RAN assistance information. The thresholds may be used by the UE when evaluating offloading/onloading conditions with RAN defined rules or ANDSF rules. Such rules allow a network to provide guidance related to where the UE should be initiating/moving its session. By applying these rules in the network, it may be possible for a base station, e.g. an eNB, (i.e. the cellular network in general) to "push" or "pull" traffic to or from the complementary network, e.g., WLAN, and in general may allow balancing between the considered radio technologies. Offloading describes the attempt to move traffic from a first network, such as a cellular communication network, to a second network, e.g. WLAN, and onloading describes the attempt to move traffic from the second network to the first network. The definitions for onload and offload may differ depending on the networks involved.

The above-mentioned thresholds may relate to the RAN and WLAN signal strength, signal quality and/or load level metrics. Any threshold can be signaled to UEs in both idle and connected mode by using broadcast messages (SIB) from the RAN. In addition, or alternatively, UEs in connected mode may receive any of the thresholds from the RAN via dedicated signalling (RRC signalling).

Examples of WLAN related metrics are: ChannelUtilizationWLAN, which reflects the channel utilization field in the BSS load; BackhaulRateDIWLAN and BackhaulRateUIWLAN, which reflect the DL/UL backhaul data rate; RCPI (received channel power indication), RSNI (received signal to noise indicator) and RSSI (received signal strength indicator), which reflect the signal strength and quality experienced by the UE.

Thresholds, including WLAN related ones, may currently be set per Public Land Mobile Network (PLMN). However, there may be large differences in access point (AP) capability/capacity. For instance, two APs which undergo the same channel utilization level may be capable of offering very different services to a UE attaching to them because e.g. they support different system bandwidths, have a different number of antennas and/or other features.

One proposal is to signal ChannelUtilizationWLAN per AP or per service set identifier (SSID). Another proposal, in discussions relating to the direct interface between WLAN and RAN, is the signaling of the WLAN thresholds on a per AP basis to allow finer load balancing optimizations. In realistic scenarios it could be expected that several dozen, up to few hundred, APs are deployed within the coverage area of a cellular cell. This proposal would result in excessive signaling when considering the current signaling mechanisms (SIB or dedicated signaling towards RRC_CONNECTED UEs).

Figure 3:
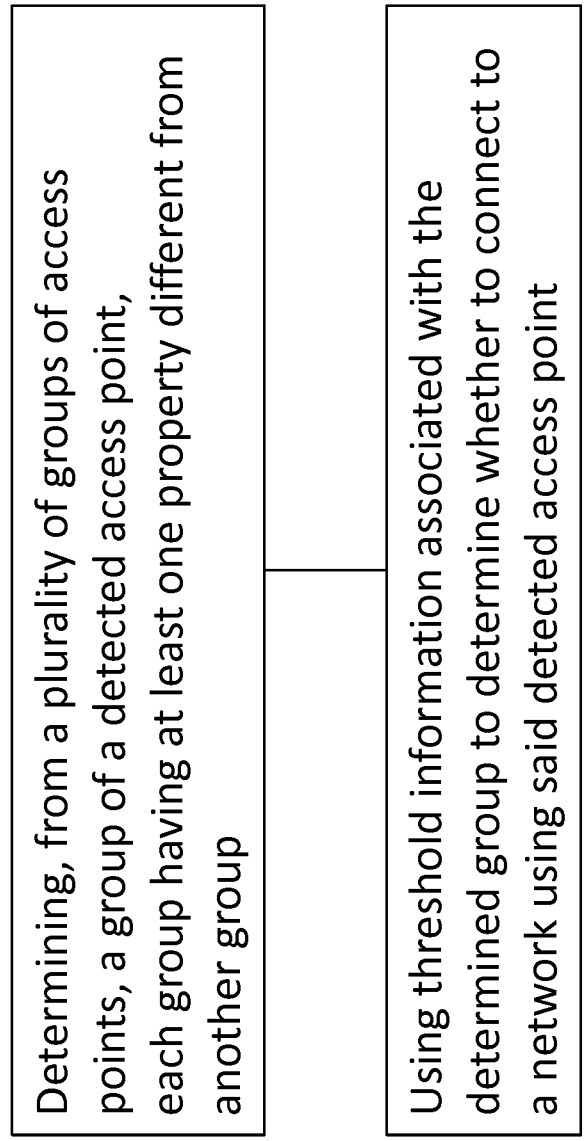
FIG. 3 shows a flow chart of a method of dynamically adjusting thresholds.

A method is shown in the flowchart of FIG. 3 for improving the granularity of the WLAN thresholds signaled from RAN in order to account for AP capabilities and improve offloading/onloading decisions while keeping signaling overhead limited. The method comprises, in a first step, determining, from a plurality of groups of access points, a group of a detected access point, each group having at least one property different from another group. In a second step, the method comprises using threshold information associated with the determined group to determine whether to connect to a network using said detected access point.

The properties of a group may be access point capability. A group, or AP class, may reflect the AP capability in terms of bps/Hz. Bps/Hz may depend on, for example. the supported standard, e.g. the supported IEEE 802.11 standard, system bandwidth (min. 20 MHz and up to 160 MHz at 5 GHz for the 802.11 ac), the number of Tx and/or Rx antennas and MIMO streams (up to 8 for 802.11 ac), beamforming support, and other features such as MAC aggregation. Many of these factors may change with the introduction of new standard versions and/or new functionalities in an earlier standard version.

The AP class may be configurable per operator on the basis of a given set of properties, e.g. WLAN metrics for a WLAN AP. Since the capability of an AP can be updated, the AP class may be changeable when AP capability changes. Preconfigured information comprising, for at least one group or AP class, properties or metrics associated with the group may be provided to a UE. Alternatively, or in addition, the cellular network may provide a list of APs and their class. The UE may receive preconfigured information from a network, such as a RAN. A non limiting example of preconfigured information is provided in the table below. Preconfigured information, such as an APclassMAP shown in Table 1 or a list of APs and their class, can be signalled to a UE by RAN by broadcast and/or RRC signaling and/or configured by operator in proprietary way.

Table 1 shows an example of an APclass MAP based on IEEE standard, supported BW, carrier frequency, and additional information.

TABLE 1

| Class Index | IEEE standard (up to) | Supported BW [Mhz] (up to) | Carrier Frequency [MHz] | Additional information [Supported number of antennas, MIMO streams, . . .] |
| --- | --- | --- | --- | --- |
| Class1 | 802.11ac | 100 | 5000 | 8 |
| Class2 | 802.11ac | 40 | 2400 | |
| . . . | | | | |
| Class N (default) | 802.11g | | | |

N is the maximum number of groups or AP classes that can be differentiated and signalled. N could be an integer with value e.g. 3. However, only the desired groups or AP classes may be signalled by RAN. Also, a subset of the properties or WLAN parameters can be used to describe a group or class. The last group or class present in the APclass MAP list will be the default group or class.

A UE may receive, for at least one group, threshold information associated with said group. The threshold information may be received from a RAN. The network, such as a RAN, may cause threshold information associated with a group to be sent. Threshold information associated with the at least one group can be signalled to a UE by RAN, for example by broadcast and/or RRC signaling and/or configured by operator in proprietary way. The network may signal threshold information per group, for example, the network may signal a WLAN measurement threshold per class as follows.

WLANmeasurementThr={Thr_Class1; Thr_Class2; Thr_Class3; . . . ; Thr_ClassN}, 1×(up to)N, where WLANmeasurementThr could be ChannelUtilizationWLAN, RSNI, RCPI, RSSI, etc; and N is the maximum number of AP classes. Threshold information may be provided only for groups of which the UE is aware. For example, WLANmeasurementThr may be signalled only for classes identified in the APclass MAP.

The UE may determine the group or class of a detected AP, for example a detected WLAN(s), in dependence on capability information of the detected AP, for example, based on WLAN AP metrics. Relevant WLAN AP metrics may be retrieved from the AP beacon and/or ANQP protocol. The group or class may be determined using an "equal to" approach where each of the WLAN metrics present in APclass MAP for a given class has to be equal to the corresponding retrieved value. In the case where a UE is provided with a list of APs and their class, the UE may detect the AP and then map the ID to the AP class as signalled. Alternatively, or in addition, an AP may report its class directly to the UE and the UE may determine the group or class of a detected AP in dependence on group information of the detected AP. If none of the classes are met then the UE may use the last class in the list (default). The UE may then use the corresponding thresholds for the AP class for the purpose of offloading/onloading.

The method can be applied to the exchange of WLAN AP information over a direct interface between WLAN and RAN. A WLAN access controller (AC) or AP may report only its class instead of the individual metrics which characterize a class for the purpose of signalling reduction.

The method may allow a UE to differentiate between APs with different capabilities resulting in most optimal offloading/onloading decisions. This may be achieved while limiting the signaling overhead in terms of both broadcast SIBs and direct UE oriented RRC signaling.

This method proposes the definition of operator-configurable Wi-Fi AP classes and the transferring of the WLAN thresholds, for the purpose of 3 GPP WLAN Radio Interworking, on a per Wi-Fi AP class basis. This may offer flexibility to differentiate between APs with different (operator configured) capabilities which exist in real deployments while limiting the signaling overhead of RAN assistance parameters.

It should be understood that each block of the flowchart of FIG. 3 and any combination thereof may be implemented by various means or their combinations, such as hardware, software, firmware, one or more processors and/or circuitry.

Figure 4:
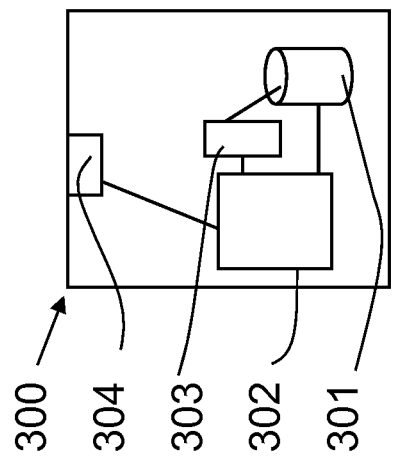
FIG. 4 shows a schematic diagram of an example control apparatus.

Parts of the method may be implemented on a control apparatus as shown in FIG. 4. FIG. 4 shows an example of a control apparatus for a communication system, for example to be coupled to and/or for controlling a station of an access system, such as an access point, e.g. a base station or (e) node B or a WLAN AP, or a node of a core network such as an MME or operations and management (O&M) node, or a server or host. The method may be implemented in a single control apparatus or across more than one control apparatus. The control apparatus may be integrated with or external to an access point or node or module of a core network. In some embodiments, APs comprise a separate control apparatus unit or module. In other embodiments, the control apparatus can be another network element such as a radio network controller or a spectrum controller. In some embodiments, each AP, or base station, may have such a control apparatus as well as a control apparatus being provided in a radio network controller. The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 109 can be configured to execute an appropriate software code to provide the control functions.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 3 GPP and WLAN, similar principles can be applied in relation to other cellular networks and wireless local area networks and to any other communication system where support operative assisted connectivity over another network is used. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they include program instructions to perform particular tasks. A computer program product may comprise one or more computer-executable components which, when the program is run, are configured to carry out embodiments.

The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi core processor architecture, as non limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
    detecting, with a user equipment connected to a radio access network, an access point of a wireless local area network, where the radio access network comprises a third generation partnership project radio access network (3GPP RAN);
    receiving, with at least one signal from the 3GPP RAN, information regarding a plurality of groups, wherein each group of the plurality of groups comprises a plurality of access points that provide access to a wireless local area network;
    determining, from the information regarding the plurality of groups comprising the plurality of access points received from the 3GPP RAN with the at least one signal, one of the groups comprising the detected access point, where the determined group comprises a plurality of access points of the wireless local area network including the detected access point;
    wherein each group has at least one property different from another group, where the at least one different property determines respective access point capabilities of each respective one of the groups, where the plurality of access points within each group share the at least one different property of that group;
    wherein the receiving with the at least one signal from the 3GPP RAN comprises receiving the at least one different property for each of the plurality of groups comprising the plurality of access points;
    receiving threshold signaling from the 3GPP RAN, the threshold signaling comprising threshold information having at least one threshold associated with the determined group comprising the plurality of access points of the wireless local area network; and
    determining whether to connect to the wireless local area network using the detected access point, based on the threshold information associated with the determined group comprising the plurality of access points of the wireless local area network signaled from the 3GPP RAN, and based on the at least one different property received from the 3GPP RAN for each of the plurality of groups comprising the plurality of access points.

2. A method according to claim 1, wherein the at least one property comprises access point capability information, the access point capability information comprising at least one of system bandwidth, a number of transmitter antennas, or a number of receiving antennas.

3. A method according to claim 2, wherein access point capability information further comprises at least one of multiple-input multiple-output streams or a supported standard.

4. A method according to claim 1 comprising: determining the group in dependence on preconfigured information.

5. A method according to claim 4, comprising receiving the preconfigured information from the radio access network.

6. A method according to claim 4, wherein the preconfigured information comprises, for at least one group of the plurality of groups, properties associated with the group.

7. A method according to claim 2 comprising: determining the group in dependence on capability information of the detected access point.

8. A method according to claim 2 comprising: receiving capability information of the detected access point from one of an access point beacon and an access network query protocol.

9. A method according to claim 4, wherein the preconfigured information comprises, for at least one group of the plurality of groups, identification information for access points associated with the group.

10. A method according to claim 9 comprising: determining the one of the groups in dependence on the identification information of the detected access point.

11. A method according to claim 1, comprising: receiving threshold information associated with a group other than the determined group of access points of the wireless local area network.

12. A method according to claim 1, wherein the wireless local area network is a complementary network to the radio access network.

13. A method comprising:
    transmitting, with at least one signal from a third generation partnership project radio access network (3GPP RAN) to a user equipment connected to the 3GPP RAN, information regarding a plurality of groups, wherein each group of the plurality of groups comprises a plurality of access points that provide access a wireless local area network;
    wherein the information regarding the plurality of groups comprising the plurality of access points transmitted from the 3GPP RAN is configured to be used with the user equipment to detect an access point of a wireless local area network;

wherein the information regarding the plurality of groups comprising the plurality of access points transmitted from the 3GPP RAN with the at least one signal is configured to be used with the user equipment to determine one of the groups comprising the detected access point, where the determined group comprises a plurality of access points of the wireless local area network including the detected access point;

wherein each group has at least one property different from another group, where the at least one different property determines respective access point capabilities of each respective one of the groups, where the plurality of access points within each group share the at least one different property of that group;

wherein the transmitting with the at least one signal from the 3GPP RAN comprises transmitting to the user equipment the at least one different property for each of the plurality of groups comprising the plurality of access points; and transmitting threshold signaling from the 3GPP RAN to the user equipment, the threshold signaling comprising threshold information having at least one threshold associated with the determined group comprising the plurality of access points of the wireless local area network;

wherein the threshold information associated with the determined group comprising the plurality of access points of the wireless local area network signaled from the 3GPP RAN, and the at least one different property signaled from the 3GPP RAN for each of the plurality of groups comprising the plurality of access points, are configured to be used with the user equipment to determine whether to connect to the wireless local area network using the detected access point.

14. A method according to claim 13 comprising: providing preconfigured information to the user equipment, said preconfigured information used to determine the group of the detected access point.

15. A method according to claim 14, wherein the preconfigured information comprises, for at least one group of the plurality of groups, properties associated with the group.

16. A method according to claim 14, wherein the preconfigured information comprises, for at least one group of the plurality of groups, identification information for access points associated with the at least one group.

17. A method according to claim 13, wherein the at least one property comprises access point capability information, the access point capability information comprising at least one of system bandwidth, a number of transmitter antennas, or a number of receiving antennas.

18. A method according to claim 17, wherein access point capability information further comprises at least one of multiple-input multiple-output streams or a supported standard.

19. A method according to claim 13 wherein the wireless local area network is a complementary network to the radio access network.

20. An apparatus comprising means for performing a method according to claim 1.

21. An apparatus in a radio access network, comprising:
at least one processor and at least one non-transitory memory including a computer program code, the at least one non-transitory memory and the computer program code configured to, with the at least one processor, cause the apparatus at least to:

detect, with a user equipment connected to a radio access network, an access point of a wireless local area network, where the radio access network comprises a third generation partnership project radio access network (3GPP RAN);

receive, with at least one signal from the 3GPP RAN, information regarding a plurality of groups, wherein each group of the plurality of groups comprises a plurality of access points that provide access to a wireless local area network;

determine, from the information regarding the plurality of groups comprising the plurality of access points received from the 3GPP RAN with the at least one signal, one of the groups comprising the detected access point, where the determined group comprises a plurality of access points of the wireless local area network including the detected access point;

wherein each group has at least one property different from another group, where the at least one different property determines respective access point capabilities of each respective one of the groups, where the plurality of access points within each group share the at least one different property of that group;

wherein the receiving with the at least one signal from the 3GPP RAN comprises receiving the at least one different property for each of the plurality of groups comprising the plurality of access points;

receive threshold signaling from the 3GPP RAN, the threshold signaling comprising threshold information having at least one threshold associated with the determined group comprising the plurality of access points of the wireless local area network; and determine whether to connect to the wireless local area network using the detected access point, based on the threshold information associated with the determined group comprising the plurality of access points of the wireless local area network signaled from the 3GPP RAN, and based on the at least one different property received from the 3GPP RAN for each of the plurality of groups comprising the plurality of access points.

22. An apparatus comprising at least one processor and at least one non-transitory memory including a computer program code, the at least one non-transitory memory and the computer program code configured to, with the at least one processor, cause the apparatus at least to:

transmit, with at least one signal from a third generation partnership project radio access network (3GPP RAN) to a user equipment connected to the 3GPP RAN, information regarding a plurality of groups, wherein each group comprising the plurality of groups comprises a plurality of access points that provide access a wireless local area network;

wherein the information regarding the plurality of groups comprising the access points transmitted from the 3GPP RAN is configured to be used with the user equipment to detect an access point of a wireless local area network;

wherein the information regarding the plurality of groups comprising the the plurality of access points transmitted from the 3GPP RAN with the at least one signal is configured to be used with the user equipment to determine one of the groups comprising the detected access point, where the determined group comprises a plurality of access points of the wireless local area network including the detected access point;

wherein each group has at least one property different from another group, where the at least one different property determines respective access point capabilities of each respective one of the groups, where the plurality of access points within each group share the at least one different property of that group;

wherein the transmitting with the at least one signal from the 3GPP RAN comprises transmitting to the user equipment the at least one different property for each of the plurality of groups comprising the plurality of access points; and transmit threshold signaling from the 3GPP RAN to the user equipment, the threshold signaling comprising threshold information having at least one threshold associated with the determined group comprising the plurality of access points of the wireless local area network;

wherein the threshold information associated with the determined group comprising the plurality of access points of the wireless local area network signaled from the 3GPP RAN, and the at least one different property signaled from the 3GPP RAN for each of the plurality of groups comprising the plurality of access points, are configured to be used with the user equipment to determine whether to connect to the wireless local area network using the detected access point.

23. A computer program embodied on a non-transitory computer-readable storage medium, the computer program comprising program code for executing a process comprising: the method as claimed in claim 1.

24. A computer program embodied on a non-transitory computer-readable storage medium, the computer program comprising program code for controlling a process to execute a process, the process comprising: the method as claimed in claim 13.

25. The method of claim 1, further comprising:
receiving a signal from the 3GPP RAN comprising a list that includes the plurality of groups comprising the plurality of access points including the group of the detected access point, each group of the plurality of groups identified as a respective class;
wherein the list includes a mapping of the classes to a plurality of properties of the access points of the class.

26. The method of claim 13, further comprising:
transmitting a signal from the 3GPP RAN comprising a list that includes the plurality of groups comprising the plurality of access points including the group of the detected access point, each group of the plurality of groups identified as a respective class;
wherein the list includes a mapping of the classes to a plurality of properties of the access points of the class.

27. The method of claim 1, wherein a wireless local area network communication standard of the wireless local area network comprises an 802.11 protocol.

28. A method according to claim 4, further comprising:
wherein the preconfigured information comprises, for at least one group of the plurality of groups, identification information for access points associated with the group, wherein the identification information comprises at least a respective access point identifier; and
determining the group in dependence on the identification information of the detected access point.

29. A method according to claim 14, further comprising:
wherein the preconfigured information comprises, for at least one group of the plurality of groups, identification information for access points associated with the group, herein the identification information comprises at least a respective access point identifier; and
determining the group in dependence on the identification information of the detected access point.

30. A method according to claim 1, wherein the threshold information associated with the determined group is used to determine whether to connect to the wireless local area network using said detected access point received with the at least one signal from the radio access network rather than maintain the connection to the radio access network to offload traffic from the radio access network to the wireless local area network.

31. A method according to claim 1, wherein the radio access network, from which the threshold signaling is received, is a wide area cellular radio access network, that provides access to a coverage area that is wider than any coverage area provided with the access points of the wireless local area network.

32. A method according to claim 1,
wherein the radio access network, from which the threshold signaling is received, is a wide area cellular radio access network that provides access to a coverage area that is wider than any coverage area provided with the access points of the wireless local area network;
wherein the at least one property comprises access point capability information of the plurality of groups comprising the plurality of access points;
wherein the access point capability information comprises at least one of system bandwidth, a number of transmitter antennas, a number of receiver antennas, multiple-input multiple-output streams or a supported standard; and
wherein the determining whether to connect to the wireless local area network using the detected access point further comprises using the access point capability information of the plurality of groups comprising the plurality of access points.

33. A method according to claim 1, further comprising:
receiving, from the 3GPP RAN, a plurality of thresholds for each group of the plurality of groups; and
determining whether to connect to the detected access point, based on the received plurality of thresholds for each group of the plurality of groups.

34. A method according to claim 1, further comprising determining whether to connect to the wireless local area network using the detected access point, in response to the at least one property of the determined group being equal to a value of a metric of the wireless local area network.

35. A method according to claim 1, wherein determining the group of the detected access point comprises receiving an identifier of the one of the groups from the detected access point, and determining the group of the detected access point using the received identifier.

36. A method according to claim 1, wherein the plurality of groups comprising the plurality of access points comprise a default group, and the determining whether to connect to the wireless local area network using the detected access point comprises determining whether to connect to an access point of the default group.

37. The method of claim 25, wherein the plurality of properties of the access points of the class comprises a wireless communication standard, a supported bandwidth, a carrier frequency, a supported number of antennas, and multiple-input multiple output streams.

* * * * *